(12) United States Patent
Emerson et al.

(10) Patent No.: US 8,201,986 B2
(45) Date of Patent: Jun. 19, 2012

(54) WARM MIX ASPHALT PRODUCTION SYSTEM AND METHOD

(75) Inventors: David Emerson, Oklahoma City, OK (US); Joseph E. Musil, Ely, IA (US)

(73) Assignee: Terex USA, LLCDE (US)

( * ) Notice: Subject to any disclaimer, the term of this patent is extended or adjusted under 35 U.S.C. 154(b) by 589 days.

(21) Appl. No.: 12/372,471

(22) Filed: Feb. 17, 2009

(65) Prior Publication Data

US 2009/0207684 A1 Aug. 20, 2009

Related U.S. Application Data

(60) Provisional application No. 61/029,515, filed on Feb. 18, 2008.

(51) Int. Cl.
*E01C 19/02* (2006.01)
*E01C 19/10* (2006.01)

(52) U.S. Cl. .................. 366/4; 366/12; 366/22; 366/40

(58) Field of Classification Search .................. 366/3, 4, 366/10, 12, 22–25, 34, 40, 54

See application file for complete search history.

(56) References Cited

U.S. PATENT DOCUMENTS

| | | | | |
|---|---|---|---|---|
| 3,423,222 A * | 1/1969 | McConnaughay | | |
| 4,106,111 A * | 8/1978 | Rose | | |
| 4,245,915 A * | 1/1981 | Bracegirdle | | |
| 4,326,560 A * | 4/1982 | Drudy | | |
| 4,586,823 A * | 5/1986 | Schondorfer et al. | | |
| 4,618,294 A * | 10/1986 | Brown | | |
| 4,787,938 A * | 11/1988 | Hawkins | | |
| 4,966,463 A * | 10/1990 | Hihara et al. | | |
| 5,054,931 A * | 10/1991 | Farnham et al. | | |
| 5,407,299 A * | 4/1995 | Sutton | | 404/75 |
| 5,419,632 A * | 5/1995 | Stephens | | 366/3 |
| 5,451,104 A * | 9/1995 | Kleen et al. | | 366/3 |
| 5,653,533 A * | 8/1997 | Green | | 366/19 |
| 5,660,465 A * | 8/1997 | Mason | | 366/3 |
| 5,772,317 A * | 6/1998 | Butler | | 366/7 |
| 5,788,755 A | 8/1998 | Salminen | | |
| 5,795,060 A * | 8/1998 | Stephens | | 366/2 |
| 5,827,360 A * | 10/1998 | Salminen | | 106/273.1 |
| 7,566,162 B1 * | 7/2009 | Swanson | | 366/7 |
| 7,784,994 B2 * | 8/2010 | Wakefield et al. | | 366/13 |
| 7,927,413 B2 * | 4/2011 | Brock et al. | | 106/122 |
| 2002/0191481 A1* | 12/2002 | Cox et al. | | |
| 2003/0227815 A1* | 12/2003 | Dillman | | |

(Continued)

OTHER PUBLICATIONS

Asphalt Emulsion Manufacturers Association, "A Basic Asphalt Emulsion Manual," Manual Series No. 19, Third Edition, downloaded from www.aema.org/downloads/BAEM_Preview.pdf.

(Continued)

*Primary Examiner* — Yogendra Gupta
*Assistant Examiner* — Emmanuel S Luk
(74) *Attorney, Agent, or Firm* — Simmons Perrine Moyer Bergman PLC

(57) ABSTRACT

A warm mix asphalt plant comprising a counter-flow drum, apparatus for precisely metering flows of A/C and water, an asphalt expander with no moving internal parts where a circular curtain of flowing clean water is mixed with a coaxial circular curtain of moving heated A/C to create asphalt foam which is heated and mixed inside a lower portion of the asphalt expander and then distributed to cover aggregate inside the counter-flow drum.

19 Claims, 10 Drawing Sheets

U.S. PATENT DOCUMENTS

2004/0244646 A1* 12/2004 Larsen et al.
2008/0259714 A1* 10/2008 Brock et al.

OTHER PUBLICATIONS

ASTEC Industries, Inc. "High Percentage Recycling With Hot Foamed Asphalt" downloaded from www.skytrust.net/Final/Workshops/NormanSmith_Astec.pdf.

Applicant admitted prior art: B. Holmbom, "Composition of Tall Oil Pitch", Institute of Wood Chemistry and Cellulose Technology, Aug. 12, 1977, Helsinki, Finland.

Applicant admitted prior art: R. W. Beaty and B. M. Bunnel, "The Manufacture of Asphalt Concrete Mixtures in the Dryer Drum", Annual Meeting of the Canadian Technical Asphalt Association, Nov. 19, 1973, Quebec City, Quebec, Canada.

Applicant admitted prior art: Eimen, Equipment Manufactured by Iowa Manufacturing Co., Jul. 2, 1973, Cedar Rapids, Iowa.

Applicant admitted prior art: Siechert, Equipment Manufactured by Iowa Manufacturing Co., Mar. 25, 1972, Cedar Rapids, Iowa.

Applicant admitted prior art: Calkins, Equipment Manufactured by Iowa Manufacturing Co., Feb. 26, 1972, Cedar Rapids, Iowa.

* cited by examiner

WARM MIX ASPHALT PRODUCTION SYSTEM AND METHOD

CROSS REFERENCE TO RELATED APPLICATIONS

This application claims the benefit of a provisional application filed on Feb. 18, 2008, and having Ser. No. 61/029,515.

BACKGROUND OF THE INVENTION

This invention relates to a counter-flow asphalt plant used to produce a variety of asphalt compositions. However, the present invention could be applicable to non-counter-flow plants as well. More specifically, this invention relates to kits to retrofit, as well as newly constructed counter-flow (and non-counter-flow) asphalt plants with a warm mix asphalt capability.

Several techniques and numerous equipment arrangements for the preparation of warm asphaltic mix, also referred to by the trade as "warm mix" or "WMA", are known from the prior art. Particularly relevant to the present invention is the use of chemical additives to the normal bitumen binder and the use of complex WMA systems with numerous moving parts, as well as plants which are difficult to retro-fit into existing asphalt plants.

SUMMARY OF THE INVENTION

More specifically, an object of the invention is to provide a WMA counter-flow asphalt plant kit capable of transforming an existing hot mix asphalt (HMA) plant into a dual-mode (HMA and WMA) asphalt plant.

Another object of the invention is to provide a WMA asphalt plant kit which is relatively easily installed into existing HMA plants.

It is a feature of the present invention to use an asphalt expander which includes no internal moving parts and may utilize just clean water to expand the bitumen binder.

The present invention includes the above-described features and achieves the aforementioned objects.

Accordingly, the present invention comprises newly constructed plants, as well as a kit for retrofitting WMA capabilities into a pre-existing HMA counter-flow asphalt plant which include an asphalt expander, with no moving internal parts, an internal expanded asphalt injection pipe assembly, sources of water and asphalt cement, and interconnecting structure.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
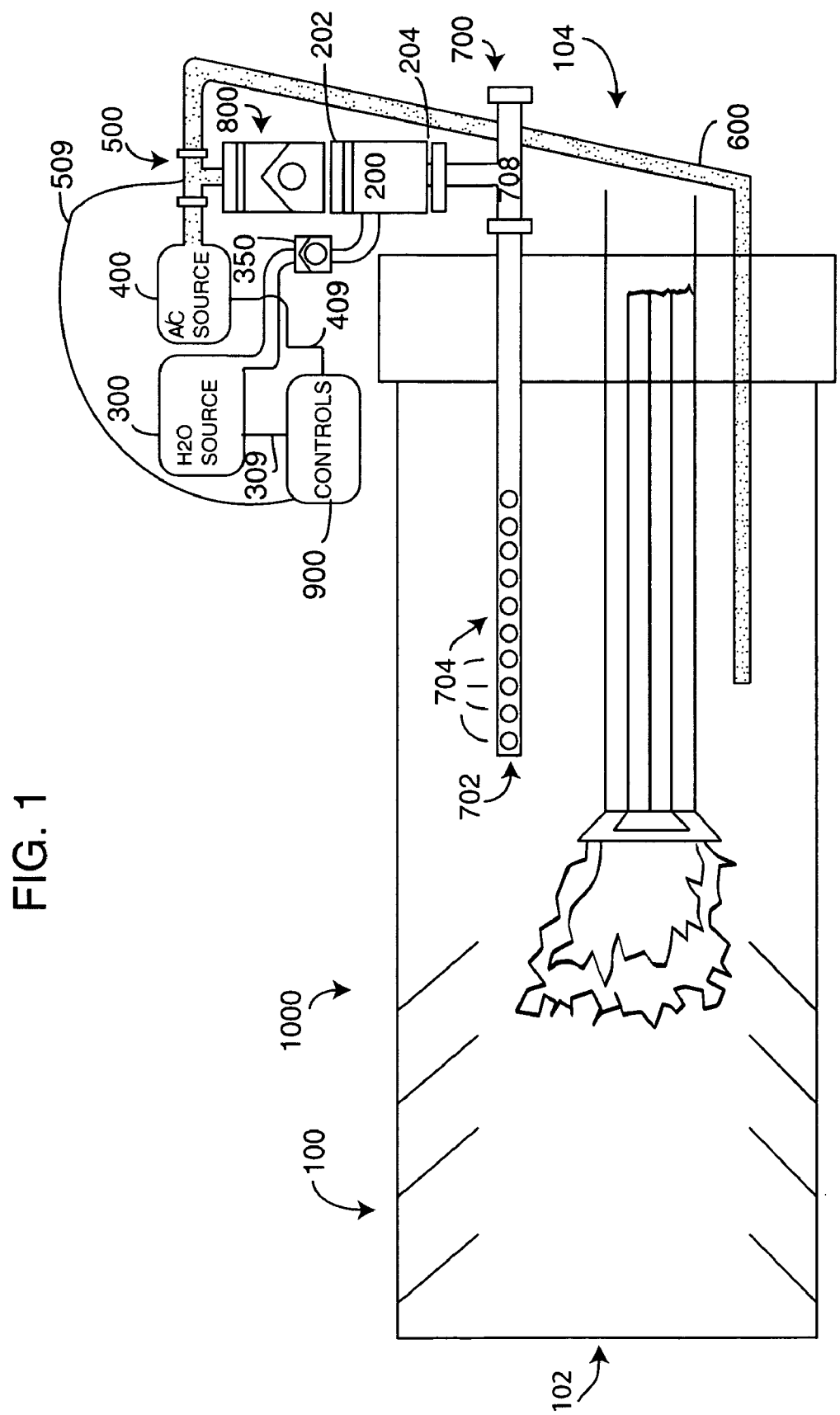
FIG. 1 is a simplified cross-sectional view of a counter-flow asphalt plant which includes therein and coupled thereto a WMA kit of the present invention.

Referring now to the drawings, where like numerals refer to like matter throughout, and referring in greater detail, attention is first directed to a prior art counter-flow asphalt plant as shown in the illustration of FIG. 1 except that it is shown with the kit of the present invention coupled thereto. The prior art asphalt plant of FIG. 1 is similar to one shown and described in greater detail in Hawkins U.S. Pat. No. 4,787,938 incorporated herein by reference.

The augmented HMA plus WMA asphalt plant 1000 of the present invention is shown with a counter-flow HMA asphalt plant rotating drum 100 with an aggregate entrance end 102 and asphalt exit end 104 which typically contains an asphalt cement internal drum delivery pipe 600 or the like. Also shown is "expanded asphalt" injection pipe assembly 700 of the present invention, as well as the structure coupled thereto to feed it with expanded asphalt foam. Shown is a water pumping and metering skid 300 (FIGS. 3 and 5) which provides water past a check valve 350 to the asphalt expander 200 to be used in the WMA asphalt foam production process, as well as an asphalt package skid 400 which is a prior art package which provides a controlled administration of asphalt cement (A/C), which may be a bitumen binder. Water pumping and metering skid 300 is coupled to a 3-way asphalt cement valve 500 which alternately provides A/C to asphalt cement internal drum delivery pipe 600 or asphalt cement check valve 800 and then on to asphalt expander 200 with an asphalt expander material input top end 202 and an asphalt expander material output bottom end 204 which couples with a portion of expanded asphalt injection pipe assembly 700. Central controls 900 can be electric, manual or omitted. Central controls 900 may provide microprocessor control of the flow rates and duration of water, A/C and valve switching, etc.

It should be understood that it also possible to eliminate the original drum asphalt cement internal drum delivery pipe 600 and the 3-way asphalt cement valve 500 and use the expanded asphalt injection pipe assembly 700 for both HMA applications with non-foamed asphalt cement and WMA applications with foamed asphalt cement.

In operation, the system of the present invention functions as follows: counter-flow HMA asphalt plant rotating drum 100 is retrofitted with an expanded asphalt injection pipe assembly 700 which is supplied with expanded asphalt foam via an asphalt expander 200 which is supplied asphalt by asphalt package skid 400 and water by water pumping and metering skid 300. As heated aggregate passes the burner, expanded asphalt foam is forced from the self-draining expanded asphalt foam injection nozzles 704 to coat the aggregate with expanded asphalt foam.

Figure 2:
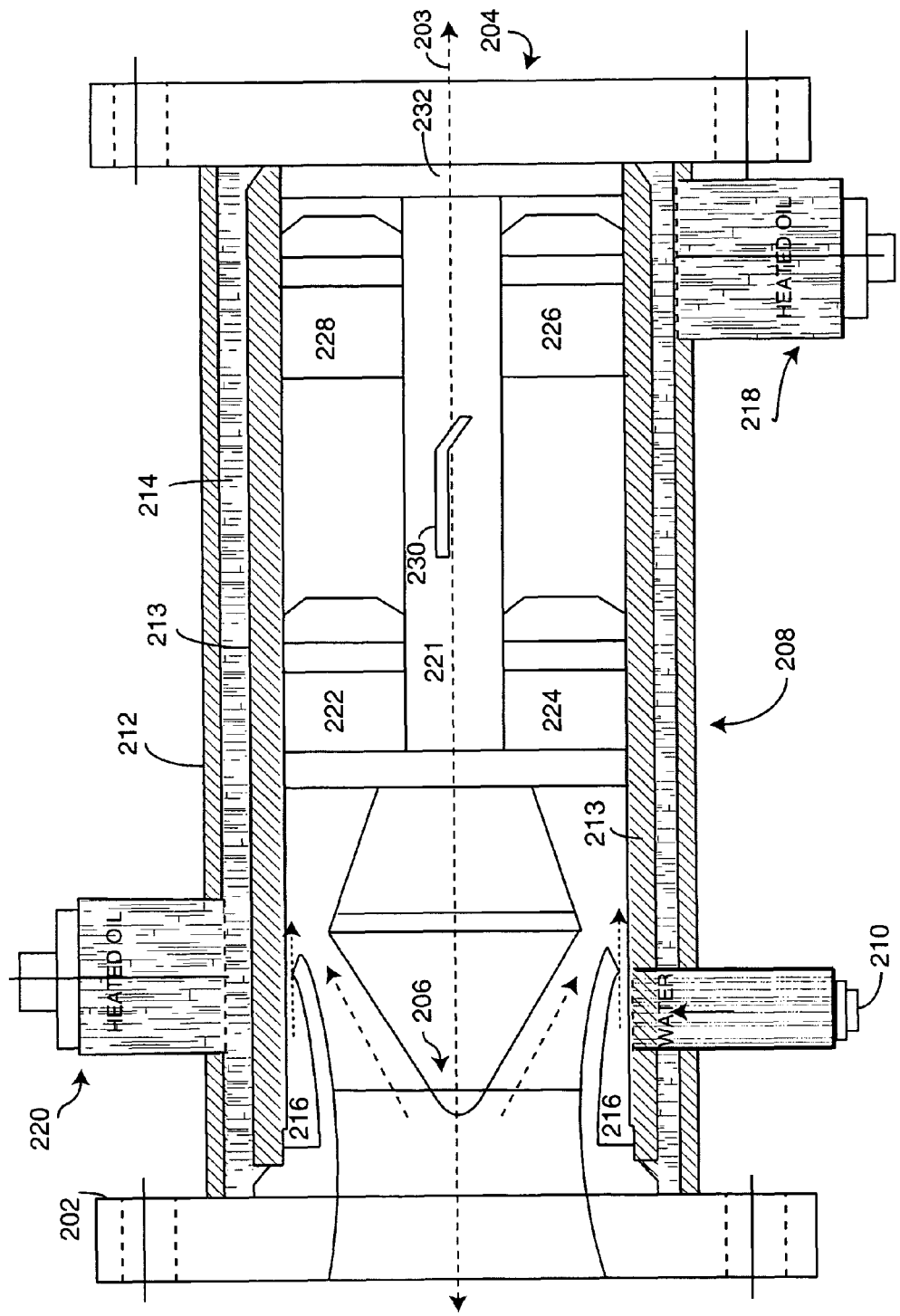
FIG. 2 is a cross-sectional view of the asphalt expander of the present invention where dotted lines with arrows refer to water flow paths and dashed lines with arrows refer to A/C flow paths.

The present invention can be better understood by now referring to FIG. 2, which shows an asphalt expander material input top end 202 which is configured to receive therein and therethrough heated A/C. Asphalt expander material input top end 202 is preferably made of stainless steel, but other suitable substitute materials could be used as well. In one embodiment, asphalt expander 200 can have a layer of insulation to help maintain internal temperature and to help prevent clogging, etc. A/C is pumped through asphalt expander material input top end 202 via coupling with a prior art asphalt package skid 400 (FIG. 1). The A/C contacts omni-directional flow diverter 206, which forces the A/C to move away from the edges of asphalt expander 200. Asphalt expander 200 is shown having an asphalt expander material output bottom end 204 with its four-tabbed base plate 232 and an asphalt expander interior central support shaft 221 disposed therebetween along a longitudinal asphalt expander axis 203.

Also shown is double-side wall pipe 208, which is shown having a water inlet port 210 extending therethrough. Double-side wall pipe 208 comprises double-walled pipe exterior wall 212 and double-walled pipe interior wall 213, which creates double-walled pipe interior hot oil void 214. Water inlet port 210 provides a point where water is metered into internal water port 216 via the water pumping and metering skid 300. The water exiting the internal water port 216 (water flow paths shown as dotted line) contacts the flowing heated A/C (A/C flow path is shown as a dashed line) and preferably creates an A/C foam with the consistency similar to that of shaving cream which moves through the asphalt expander 200 and mixes as it contacts various objects therein, such as first expansion flow diverter 222, second expansion flow diverter 224, third expansion flow diverter 226, fourth expansion flow diverter 228 and central flow diverter 230. The asphalt expander 200 is heated via pumping heat out into heated oil entry port 220 through the double-walled pipe interior hot oil void 214 and out of heated oil exit port 218.

Figure 3:
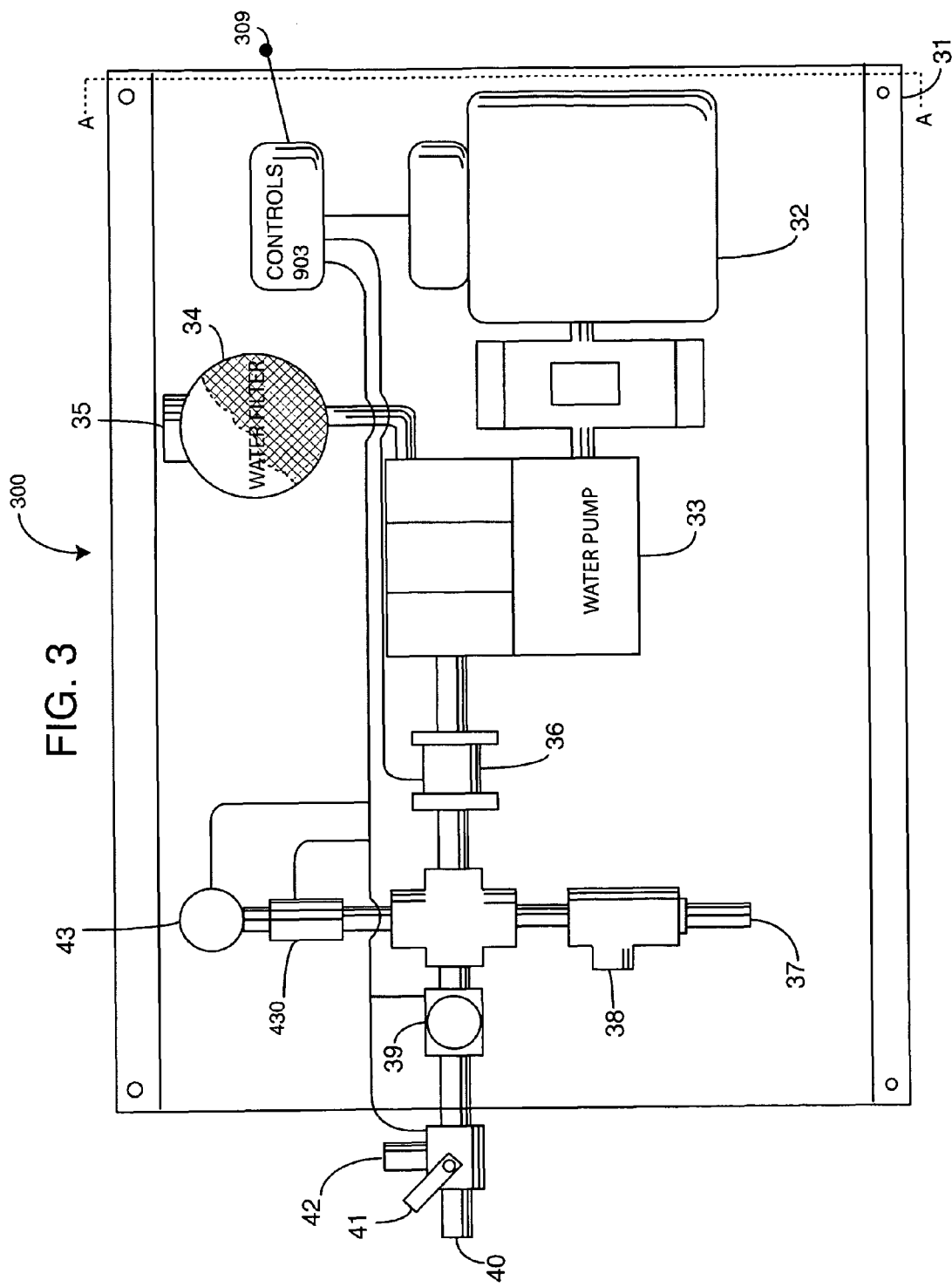
FIG. 3 is a plan view of a water source package of the present invention.

Now referring to FIG. 3, there is shown the water pumping and metering skid 300 which includes a water pumping and metering base skid 31 which provides support for all of the structure thereon. Also shown is electric motor 32 which could be a 5 HP TEFEC 1800 RPM 3-phase 460 volt electric motor, with a variable frequency drive module, or a suitable substitute which is coupled directly to or drives via a sheave and belt, or the like, the water pump 33, which could be a 3-section/piston rotary positive displacement water pump. Water is provided to the water pump 33 via water inlet location 35 and water filter 34. Water pump 33 pumps the water to water meter 36, which may be a Sparling FM656 water meter which requires 110V AC power. Water meter 36 provides water to a 4-way coupler which is coupled to water pressure relief valve 37, which has a relief valve output 38, which can return water to a tank (not shown). A 4-way coupler is also coupled to water on/off valve 39, which could be a 110V AC solenoid valve which goes to OFF without power and a water pressure gauge (0-200 psi) 43 and shutoff valve 430. Water on/off valve 39 is coupled to water skid output 40 via 3-way manual or electric valve 41, which also has a calibration water output 42.

The narrow lines connecting the various components are optional electronic control lines for linking water source controls 903 and then to central controls 900 (FIG. 1) via line 309.

The water pumping and metering skid 300 provides a closely controlled supply of clean cold water to the asphalt expander 200. The amount of water is approximately between 1-4% of the mass weight of the A/C binder. Assuming a 400-tons per hour asphalt production rate with a 5% A/C (i.e., 5% of the 400 tons per hour output is A/C) with a 3% of the A/C weight being water, you would need approximately 2.4 gallons of water per minute. Depending upon how much water (1-4%) is added to the A/C, the A/C can expand between 3-18 times.

Now referring to FIG. 1, there is shown an asphalt package skid 400. It should be understood that the asphalt package is a common component of every HMA counter-flow drum asphalt plant. It will vary in some details from plant to plant; however, it should be understood that in general, the asphalt package skid 400 meters the A/C to be provided to the drum. The same system can be used and adjusted to meter the A/C for WMA applications as for HMA applications. Optional A/C controls may be coupled to central controls 900 via line 409.

Figure 4:
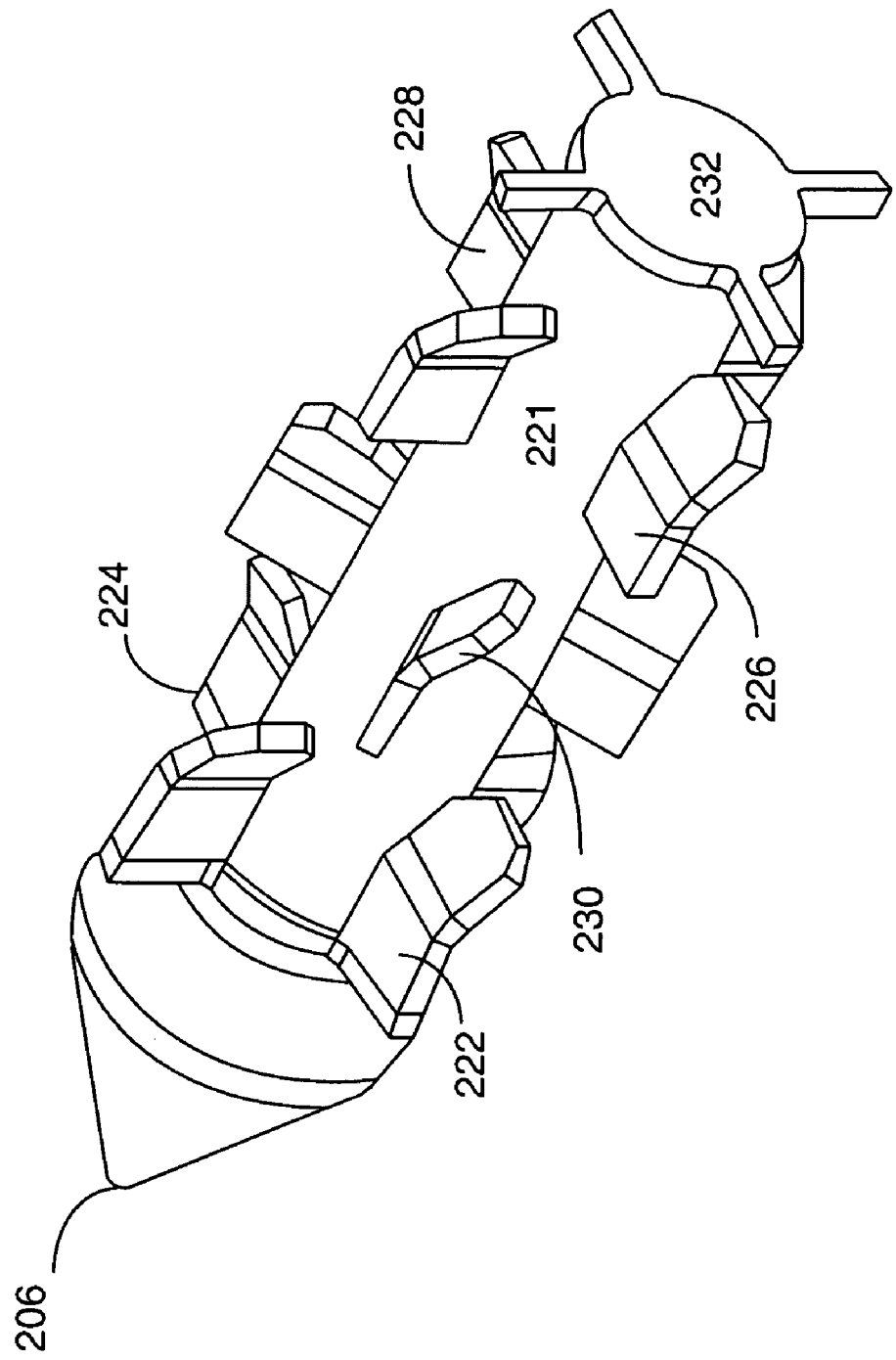
FIG. 4 is a perspective view of a flow diverter from inside of the asphalt expander of FIG. 2.

Now referring to FIG. 4, there is shown the internal components of asphalt expander 200, which includes an asphalt expander interior central support shaft 221 with an omni-directional flow diverter 206 disposed on its top end. Also disposed on asphalt expander interior central support shaft 221 is first expansion flow diverter 222, second expansion flow diverter 224, third expansion flow diverter 226, fourth expansion flow diverter 228 and central flow diverter 230. It should also be understood that there could be fewer or more than 4 diverter stages. At the bottom end of asphalt expander interior central support shaft 221, there is shown four-tabbed base plate 232. The expanded A/C is mixed by moving around the various expansion flow diverters 222, 224, 226, 228 and 230.

Figure 5:
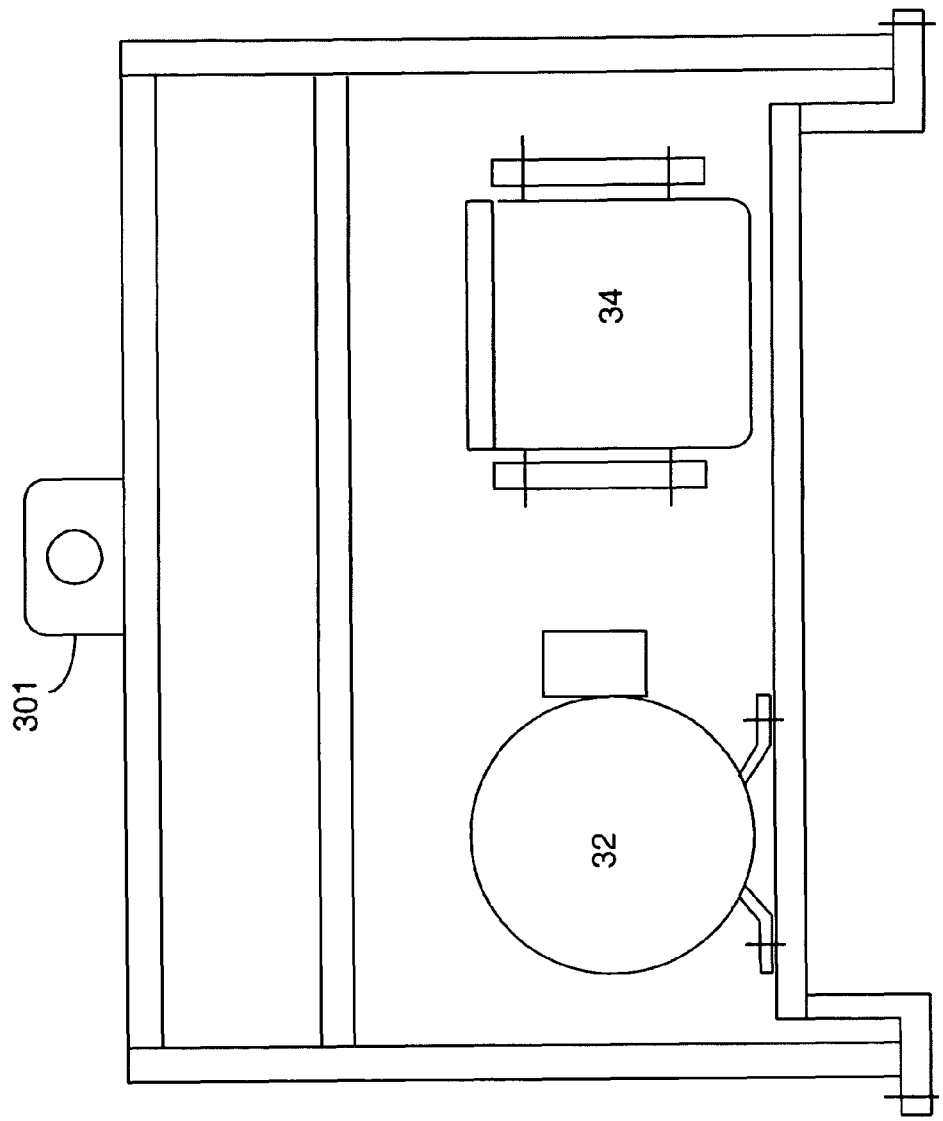
FIG. 5 is a cross-sectional view of the water source package taken on line A-A of FIG. 3.

Now referring to FIG. 5, there is shown a cross-sectional view of the water pumping and metering skid 300 taken on line A-A of FIG. 3. It is shown having a superstructure with lifting point 301 such that the water pumping and metering skid 300 is configured to be lifted from above via a crane or other lifting machine. Also shown is control line 509.

Figure 6:
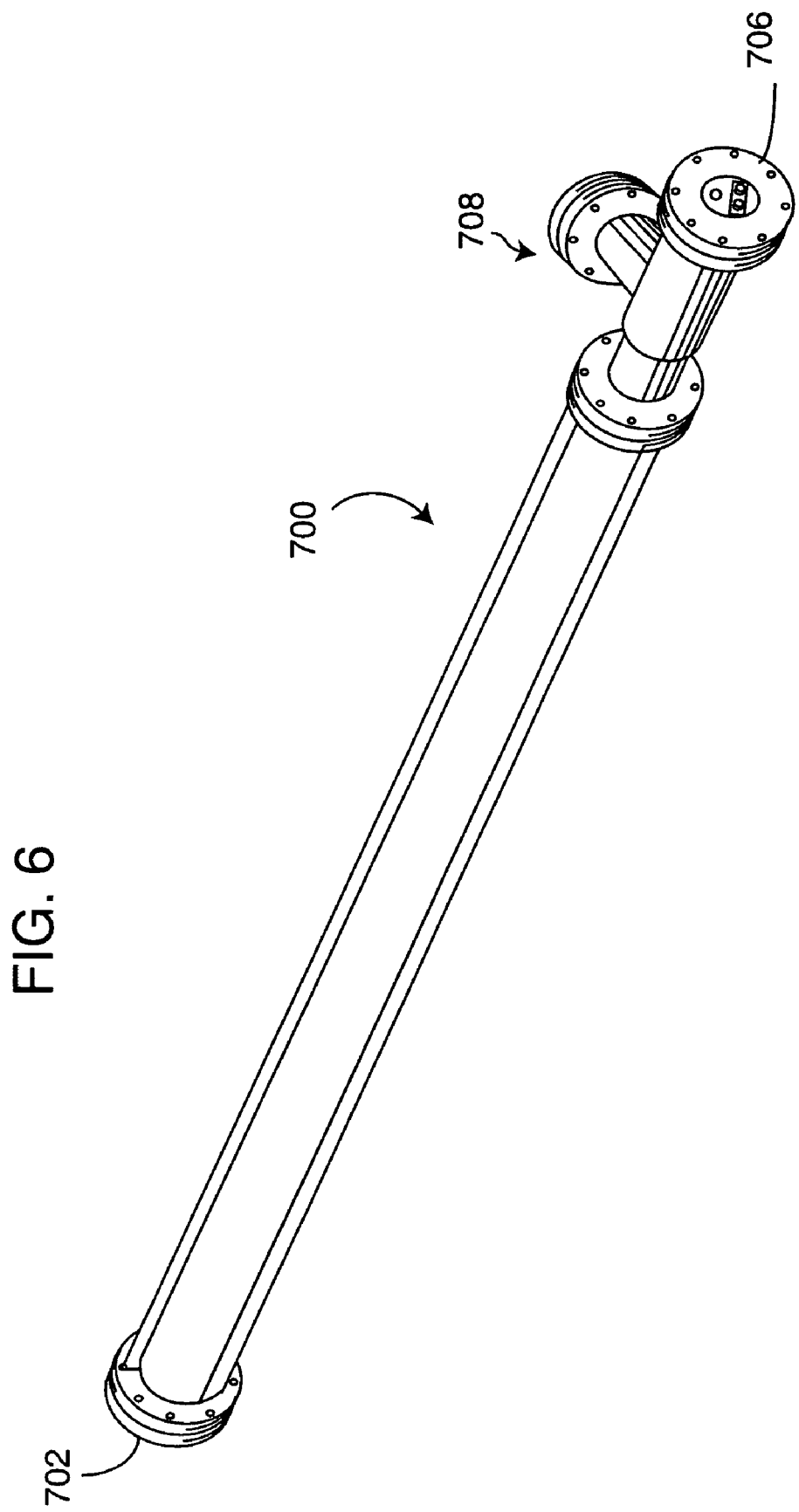
FIG. 6 is a perspective view of the expanded asphalt injection pipe assembly of the present invention.

Now referring to FIG. 6, there is shown an expanded asphalt injection pipe assembly 700 with an expanded asphalt injection pipe distal end 702, an expanded asphalt injection pipe material inlet end 708, and an expanded asphalt injection pipe inspection port end 706.

Figure 7:
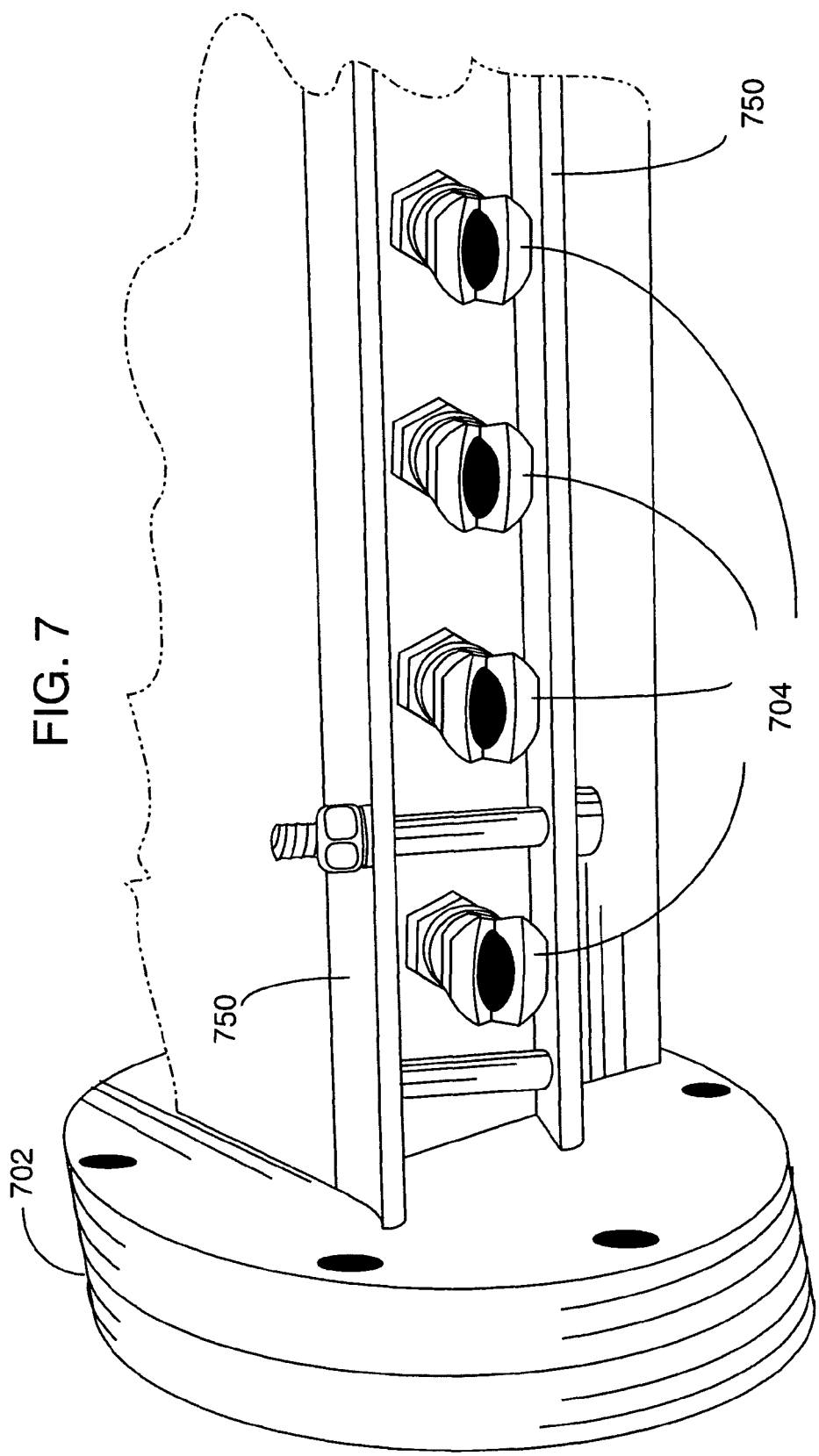
FIG. 7 is a close-up view of an end of the expanded asphalt injection pipe assembly of FIG. 6.

Now referring to FIG. 7, there is shown a close-up of the expanded asphalt injection pipe distal end 702 with a plurality of expanded asphalt injection pipe spray nozzles 704 and the expanded asphalt injection pipe nozzle opening flanges 750.

Figure 8:
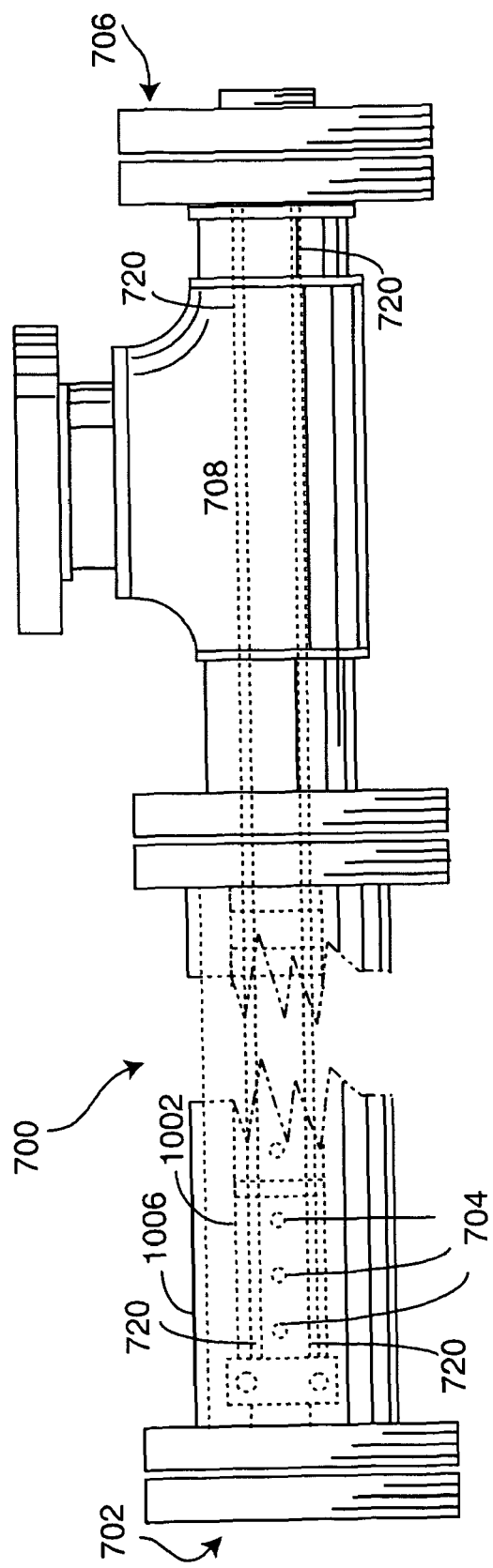
FIG. 8 is a top view of the expanded asphalt injection pipe assembly of FIGS. 6 and 7 where the dashed lines represent internal structure hidden from view.

Now referring to FIG. 8, there is shown a top view of the expanded asphalt injection pipe assembly 700 of FIGS. 6 and 7. The dotted lines inside the expanded asphalt injection pipe assembly 700 show the location of internal pipes and pipe walls. Lines 720 are heated oil lines for providing a path for hot oil to be pumped so as to provide heating capabilities to keep the expanded asphalt foam flowing freely.

Figure 9:
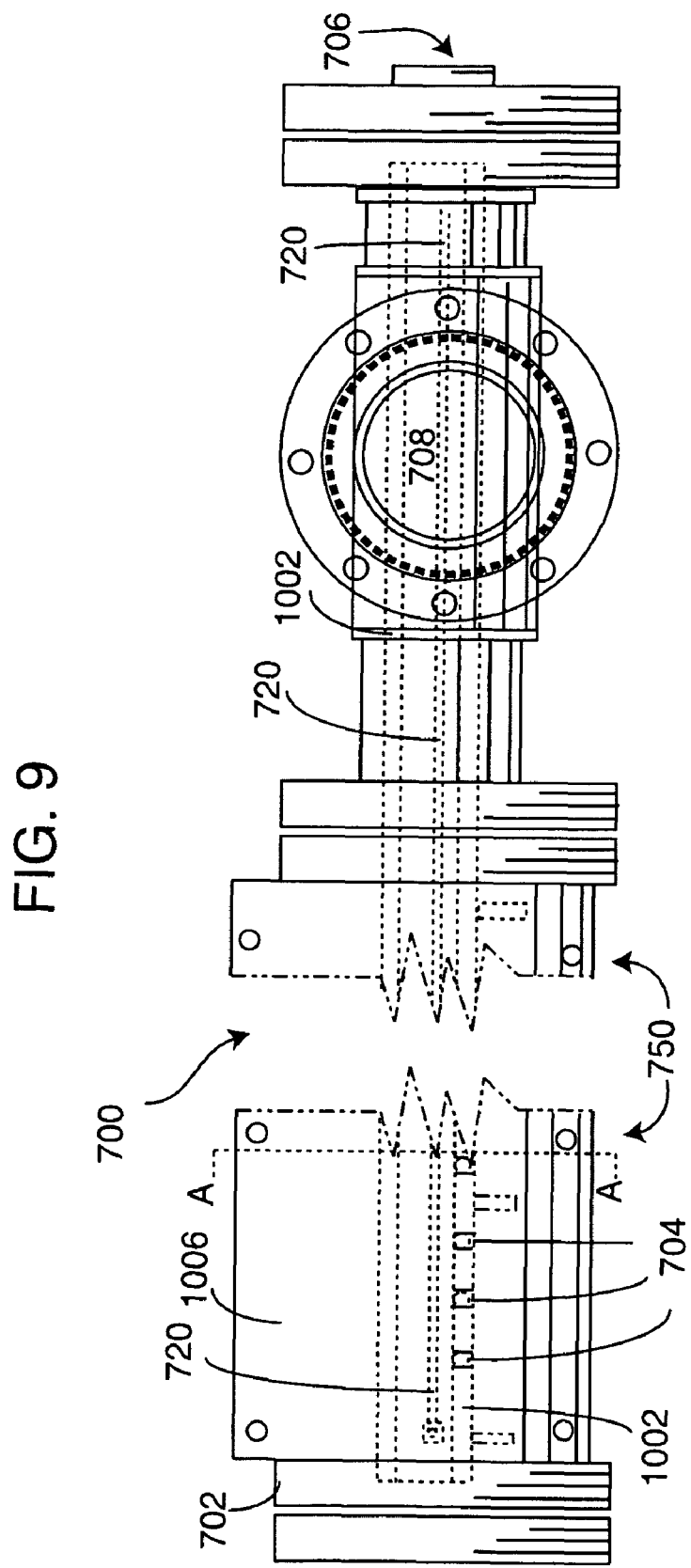
FIG. 9 is a side view of the expanded asphalt injection pipe assembly of FIGS. 6, 7 and 8 where the dashed lines represent internal structure hidden from view.

Now referring to FIG. 9, there is shown a side view of the expanded asphalt injection pipe assembly 700 of FIGS. 6-8, where the dotted lines refer to internal pipes and pipe walls.

Figure 10:
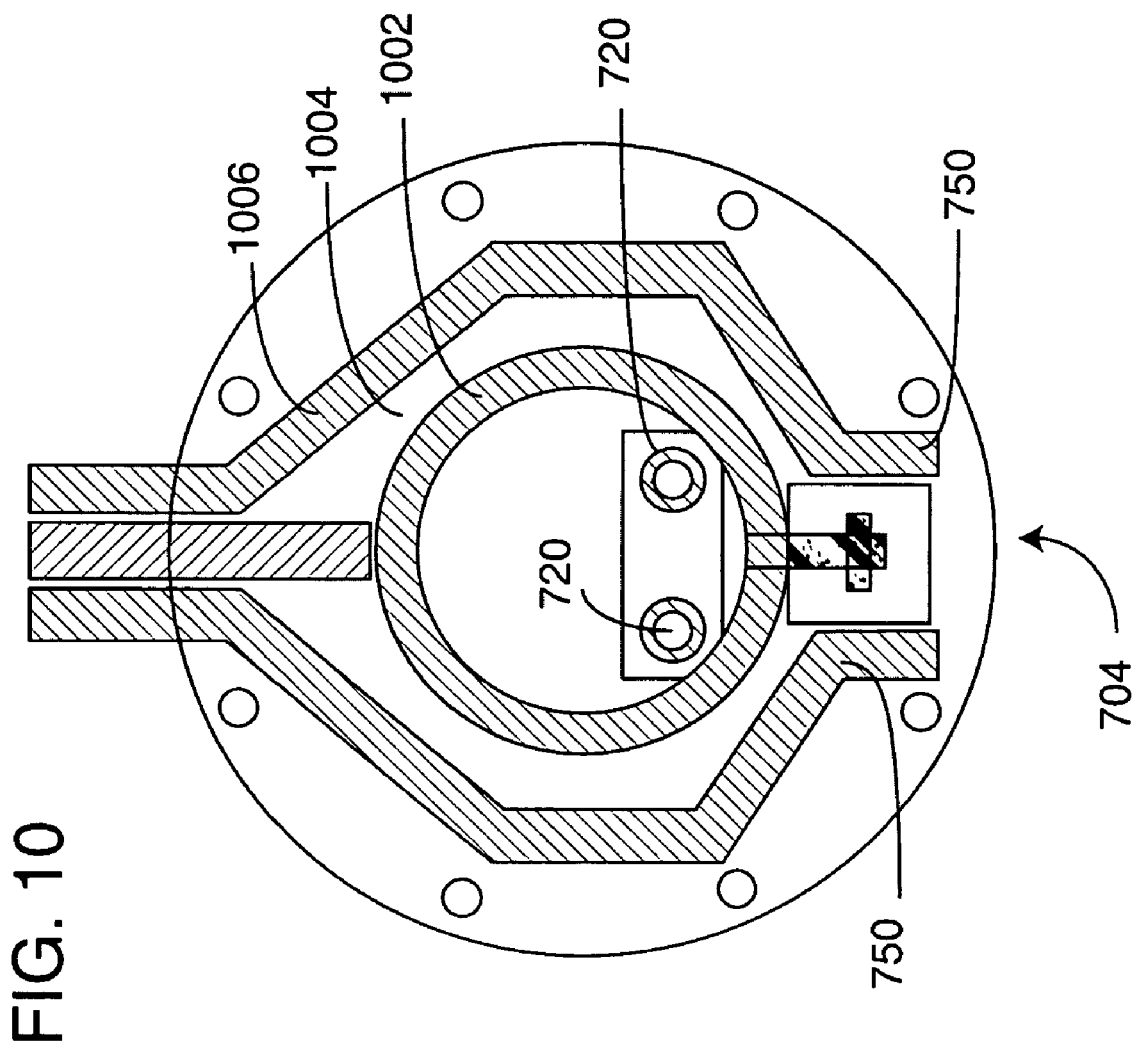
FIG. 10 is a cross-sectional view of the expanded asphalt injection pipe assembly taken on line A-A of FIG. 9.

Now referring to FIG. 10, there is shown a cross-sectional view of the expanded asphalt injection pipe assembly 700 taken on line A-A of FIG. 9. Protective cover 1006 is shown disposed over insulation 1004 which is around foamed asphalt pipe 1002.

It is believed that when these teachings are combined with the known prior art by a person skilled in the art of WMA asphalt drum design and operation, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

We claim:

1. A warm mix asphalt counter-flow drum plant comprising:
   a counter-flow hot mix asphalt plant rotating drum;
   an asphalt expander configured to accept heated asphalt cement (A/C) and generate an expanded asphalt foam;
   means for providing measured and controlled amounts of water to said asphalt expander;
   means for selectively providing measured amounts of A/C to a plurality of internal drum A/C delivery pipes;
   wherein said plurality of internal A/C delivery pipes comprises a hot mix asphalt cement internal drum delivery pipe and a warm mix expanded asphalt injection pipe assembly;
   an asphalt cement check valve between said asphalt expander and said means for selectively providing measured amounts of asphalt cement;
   wherein said asphalt expander is free of any moving internal parts therein and comprises:
   an asphalt expander material input top end; asphalt expander material output bottom end;
   a longitudinal asphalt expander axis extending from a central location at said asphalt expander material input top end to a central location at said asphalt expander material output bottom end;
   a double side wall pipe extending from the top end to the bottom end, disposed coaxially about said longitudinal asphalt expander axis;
   asphalt expander interior central support shaft disposed along said longitudinal asphalt expander axis;
   an omni-directional flow diverter disposed on top of said support shaft and inside said material input top end;
   said omni-directional flow diverter configured to divert incoming heated A/C to only a plurality of peripheral locations inside said double sidewall pipe;
   a fluid injection ring disposed circumferentially around said longitudinal asphalt expander axis and configured to provide a ring of flowing fluid to contact the heated A/C at said plurality of peripheral locations;
   a plurality of expansion flow diverters disposed below said fluid injection ring configured to mix a flow of foam created as the ring of flowing fluid contacts the heated A/C being pumped into said asphalt expander; and
   said asphalt expander further having a plurality of ports for aiding in the flow of heated oil through a cylindrical void located coaxially about said longitudinal asphalt expander axis in said double side wall pipe.

2. The apparatus of claim 1 wherein said ring of flowing fluid is a water ring.

3. The apparatus of claim 2 wherein said water ring is a continuous curtain of flowing water.

4. The apparatus of claim 3 wherein said expanded asphalt injection pipe assembly comprises a plurality of nozzles configured to disperse a heated foam.

5. The apparatus of claim 4 further comprising a plurality of electronic components configured for automatically adjusting an amount of water provided to the asphalt expander depending upon an amount of A/C entering the asphalt extender.

6. The apparatus of claim 5 wherein said controls communicate over a wireless link.

7. A system for providing warm mix asphalt, the system comprising:
   a rotating drum configured to receive at an aggregate receiving end aggregate material, and further configured to create hot mix asphalt with a drum exit temperatures in excess of 275 degrees Fahrenheit;
   an asphalt expander configured to receive heated asphalt cement and mix in water at a rate of between 1% to 4% water weight to A/C weight, and thereby form an asphalt foam without contacting any moving parts within said asphalt expander; the asphalt foam being of a consistency to coat aggregate material at a lower aggregate material temperature; and
   means to distribute said asphalt foam within said rotating drum and contacting heated aggregate moving therethrough and thereby create warm mix asphalt with a rotating drum exit temperature of between approximately 220 degrees to 275 degrees Fahrenheit; and
   wherein said means to distribute said asphalt foam comprises a single pipe which is configured to distribute both expanded foam and non-expanded asphalt cement and further comprising means for heating said asphalt foam while disposed in said asphalt expander.

8. The apparatus of claim 7 where said means for heating said foam further comprises a means for providing heated liquids to said asphalt expander.

9. An apparatus of claim 8 wherein said means for heating said asphalt foam further comprises a void disposed about an exterior of said asphalt expander configured to receive therein and to pass therethrough heated liquids.

10. An apparatus of claim 7 further comprising a means for automatically controlling a rate of water provided to said asphalt expander, so that weight of said water is set to be at a predetermined point within a range of 1% to 4% of a weight characteristic of said A/C.

11. An apparatus of claim 10 wherein said water is substantially clean water, being free from material which would substantially affect production of asphalt foam upon mixture of said water with said A/C.

12. An apparatus of claim 11 wherein said asphalt expander comprises a means for creating a flowing curtain of clean water.

13. The apparatus of claim 12 further comprising a means for diverting a flow of A/C through said flowing curtain of clean water.

14. The apparatus of claim 13 further comprising a plurality of diverters to increase homogeneity of foam created when said flow of A/C meets said flowing curtain of clean water.

15. The apparatus of claim 14 wherein said means to distribute said asphalt foam comprises a single pipe, disposed within said rotating drum, which is configured to distribute both expanded foam and non-expanded asphalt cement, and further comprising a hot oil retaining jacket disposed around said asphalt expander to facilitate introduction of heat into said asphalt expander so as to heat said asphalt foam after cooling occurs when the curtain of flowing water creates steam.

16. An asphalt counter-flow drum plant comprising:
   a counter-flow asphalt plant rotating drum;
   an asphalt expander configured to accept asphalt cement (A/C) and generate an expanded asphalt foam;
   means for providing measured and controlled amounts of water to said asphalt expander;
   means for selectively providing measured amounts of A/C to a plurality of internal drum A/C delivery pipes;

wherein said plurality of internal A/C delivery pipes comprises a asphalt cement internal drum delivery pipe and a expanded asphalt injection pipe assembly;

an asphalt cement check valve between said asphalt expander and said means for selectively providing measured amounts of asphalt cement;

wherein said asphalt expander is free of any moving internal parts therein and comprises:

an asphalt expander material input top end; asphalt expander material output bottom end;

a longitudinal asphalt expander axis extending from a central location at said asphalt expander material input top end to a central location at said asphalt expander material output bottom end;

a double side wall pipe extending from the top end to the bottom end, disposed coaxially about said longitudinal asphalt expander axis;

asphalt expander interior central support shaft disposed along said longitudinal asphalt expander axis;

an omni-directional flow diverter disposed on top of said support shaft and inside said material input top end;

said omni-directional flow diverter configured to divert incoming A/C to only a plurality of peripheral locations inside said double sidewall pipe;

a fluid injection ring disposed circumferentially around said longitudinal asphalt expander axis and configured to provide a ring of flowing fluid to contact the A/C at said plurality of peripheral locations;

a plurality of expansion flow diverters disposed below said fluid injection ring configured to mix a flow of foam created as the ring of flowing fluid contacts the A/C being pumped into said asphalt expander; and said asphalt expander further having a plurality of ports for aiding in the flow of oil through a cylindrical void located coaxially about said longitudinal asphalt expander axis in said double side wall pipe.

17. The apparatus of claim 16 wherein said ring of flowing fluid is a water ring.

18. The apparatus of claim 17 wherein said water ring is a continuous curtain of flowing water.

19. The apparatus of claim 18 wherein said expanded asphalt injection pipe assembly comprises a plurality of nozzles configured to disperse a heated foam.

* * * * *